US007849879B2

(12) United States Patent
Rauch et al.

(10) Patent No.: US 7,849,879 B2
(45) Date of Patent: Dec. 14, 2010

(54) POWDER PAINT RECIRCULATION BLOCK ASSEMBLY

(75) Inventors: Frank P. Rauch, Wyandotte, MI (US); Eric G. Norrmalm, Brooklin (CA); Fei Yang, Oshawa (CA); Gunnar Van Der Steur, Chesapeake City, MD (US)

(73) Assignee: GM Global Technology Operations, Inc., Detroit, MI (US)

( * ) Notice: Subject to any disclaimer, the term of this patent is extended or adjusted under 35 U.S.C. 154(b) by 782 days.

(21) Appl. No.: 11/843,687

(22) Filed: Aug. 23, 2007

(65) Prior Publication Data

US 2009/0050709 A1 Feb. 26, 2009

(51) Int. Cl.
*F16K 11/20* (2006.01)

(52) U.S. Cl. ........................... 137/625.47; 137/625.11; 210/284; 118/312

(58) Field of Classification Search ................. 137/580, 137/625.11, 625.16, 625.19, 625.47; 210/278, 210/284, 290, 676; 118/312
See application file for complete search history.

(56) References Cited

U.S. PATENT DOCUMENTS

| | | | | |
|---|---|---|---|---|
| 1,230,007 | A * | 6/1917 | Milliken | 251/8 |
| 2,575,240 | A * | 11/1951 | Thompson | 137/885 |
| 3,348,774 | A * | 10/1967 | Wiggins | 239/70 |
| 3,840,038 | A * | 10/1974 | Smith | 137/637.1 |
| 4,281,683 | A * | 8/1981 | Hetherington et al. | 137/606 |
| 4,830,055 | A * | 5/1989 | Kolibas | 137/884 |
| 5,131,423 | A * | 7/1992 | Shaw | 137/1 |
| 5,146,950 | A * | 9/1992 | Rodgers et al. | 137/563 |
| 5,474,276 | A * | 12/1995 | Steinbock et al. | 251/4 |
| 6,321,782 | B1 * | 11/2001 | Hollister | 137/557 |
| 6,619,563 | B2 * | 9/2003 | van der Steur | 239/125 |
| 6,892,764 | B2 * | 5/2005 | Rodrigues et al. | 137/884 |
| 7,241,080 | B2 * | 7/2007 | Klobucar et al. | 406/50 |
| 2001/0003568 | A1 * | 6/2001 | Dietrich | 406/131 |

* cited by examiner

*Primary Examiner*—John Fox

(57) ABSTRACT

A powder paint recirculation block assembly for use in a powder paint transfer assembly, and a method of operation, is disclosed. The recirculation block assembly includes a powder paint recirculation block body having an intake flow passage directing flow to an applicator flow passage leading to an application flow control assembly and a return flow passage leading to a return flow control assembly. The angles (change in direction) through which powder paint flows may be minimized to minimize potential impact fusion. The pinch rubbers in pneumatic pinch valves of the application flow control assembly and return flow control assembly may be removable to allow for valve repair.

17 Claims, 3 Drawing Sheets

POWDER PAINT RECIRCULATION BLOCK ASSEMBLY

BACKGROUND OF INVENTION

The present invention relates generally to a powder paint transfer assembly, and more particularly to a powder paint recirculation block assembly for use in the powder paint transfer assembly.

Paint application systems, such as those for painting vehicle bodies, may include recirculation valve assemblies that selectively direct the paint either to a paint applicator or back to the supply of paint. Some of these paint application systems are used specifically for the application of powder paint to the vehicle bodies. A problem that has arisen in the paint application systems for powder paint is that the recirculation valve assemblies include flow direction changes at relatively large angles. These large angles of flow direction change do not work well with powder paint. This is because the large angles of flow direction change are believed to cause impact fusion to occur—impact fusion is believed to be caused when powder paint particles impact together causing heat, which then fuses the particles together. The fused powder paint, then, eventually closes off the flow passages, requiring the painting operations to stop while eliminating these clogs.

Another problem that has arisen in the paint application systems for powder paint is that some of the recirculation valve assemblies include pinch valves, and the pinch valves do not have serviceable components. As a result, when the assembly is cleaned (after painting) the membranes of the pinch rubbers wear, which eventually leads to failure of the rubbers. Since the pinch valves do not have individual serviceable components, the entire valve assembly must be replaced when the membranes are worn out. This results in much higher maintenance cost than is desirable.

Thus, it is desirable to have a powder paint recirculation block assembly for use in a powder paint transfer assembly that overcomes the drawbacks of the prior art.

SUMMARY OF INVENTION

An embodiment contemplates a powder paint recirculation block assembly for use in a powder paint transfer assembly. The recirculation block assembly may comprise a powder paint recirculation block body, an application flow control assembly and a return flow control assembly. The powder paint recirculation block body may have an intake end and an outlet end, and include an intake flow passage, an applicator flow passage, and a return flow passage, the intake flow passage extending from the intake end to the applicator flow passage and the return flow passage, the applicator flow passage extending from the intake flow passage at a first angle that is less than forty-five degrees toward the outlet end, and the return flow passage extending from the intake flow passage at a second angle that is less than forty-five degrees toward the outlet end. The application flow control assembly may be mounted to the recirculation block body and include a first pinch valve assembly in operative alignment with the applicator flow passage and operative to selectively prevent powder paint flow through the applicator flow passage. The return flow control assembly may be mounted to the recirculation block body and include a second pinch valve assembly in operative alignment with the return flow passage and operative to selectively prevent powder paint flow through the return flow passage.

An embodiment contemplates a powder paint recirculation block assembly for use in a powder paint transfer assembly. The recirculation block assembly may comprise a powder paint recirculation block body, an application flow control assembly and a return flow control assembly. The powder paint recirculation block body may have an intake end and an outlet end, and include an intake flow passage, an applicator flow passage, and a return flow passage, the intake flow passage extending from the intake end to the applicator flow passage and the return flow passage, the applicator flow passage extending from the intake flow passage at a first angle, and the return flow passage extending from the intake flow passage at a second angle toward the outlet end. The application flow control assembly may be mounted to the recirculation block body and include a first pinch valve assembly in operative alignment with the applicator flow passage and operative to selectively prevent powder paint flow through the applicator flow passage. The return flow control assembly may be mounted to the recirculation block body and include a second pinch valve assembly in operative alignment with the return flow passage and operative to selectively prevent powder paint flow through the return flow passage; wherein one of the first and second pinch valve assemblies includes a first pinch valve body that is threadably removable from the recirculation block body and a first pinch rubber that is removable from the first pinch valve body when the first pinch valve body is threadably removed from the recirculation block body.

An embodiment contemplates a method of selectively directing powder paint to a powder paint applicator and a source hopper, the method comprising the steps of: directing a flow of the powder paint into an intake flow passage extending into a powder paint recirculation block body; closing a first pinch valve assembly in a return flow control assembly while directing the flow through a second open pinch valve assembly in an application flow control assembly to thereby cause the flow of the powder paint from the intake passage through an applicator flow passage that redirects the flow of the powder paint at a first angle that is less than forty-five degrees; closing the second pinch valve assembly while opening the first pinch valve assembly to thereby cause the flow of the powder paint from the intake passage through a return flow passage that redirects the flow of the powder paint at a second angle that is less than forty-five degrees; directing the powder paint from the open first pinch valve assembly into the source hopper; and directing the powder paint from the open second pinch valve assembly to the powder paint applicator.

An advantage of an embodiment is that the relatively small angles for the change of directions for flow of powder paint in the powder paint recirculation block assembly avoid the potential powder paint plugging issues in the interior passages.

An advantage of an embodiment is that the pinch rubbers of the pinch valve assemblies are serviceable, thus reducing costs by avoiding the need to purchase entire new assemblies when the rubbers need replacement.

An advantage of an embodiment is that a recirculation block body made of polytetrafluoroethylene (PTFE) provides for desirable flow of the powder paint through the passages of the block body.

DETAILED DESCRIPTION

Figure 1:
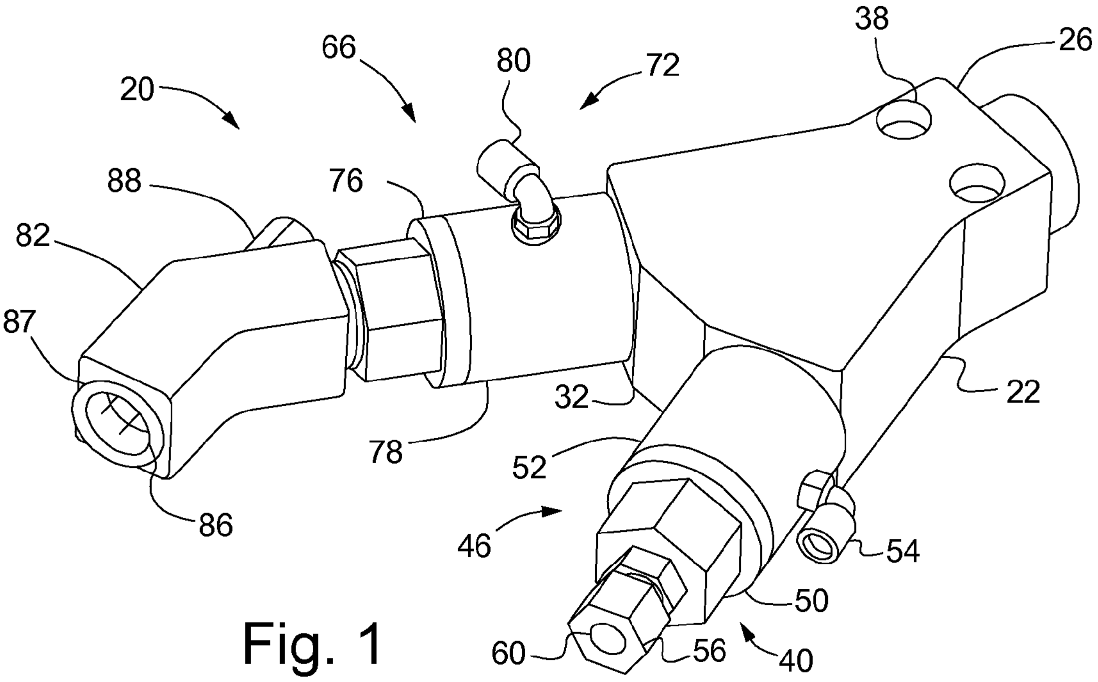
FIG. 1 is a perspective view of a powder paint recirculation block assembly.
Figure 2:
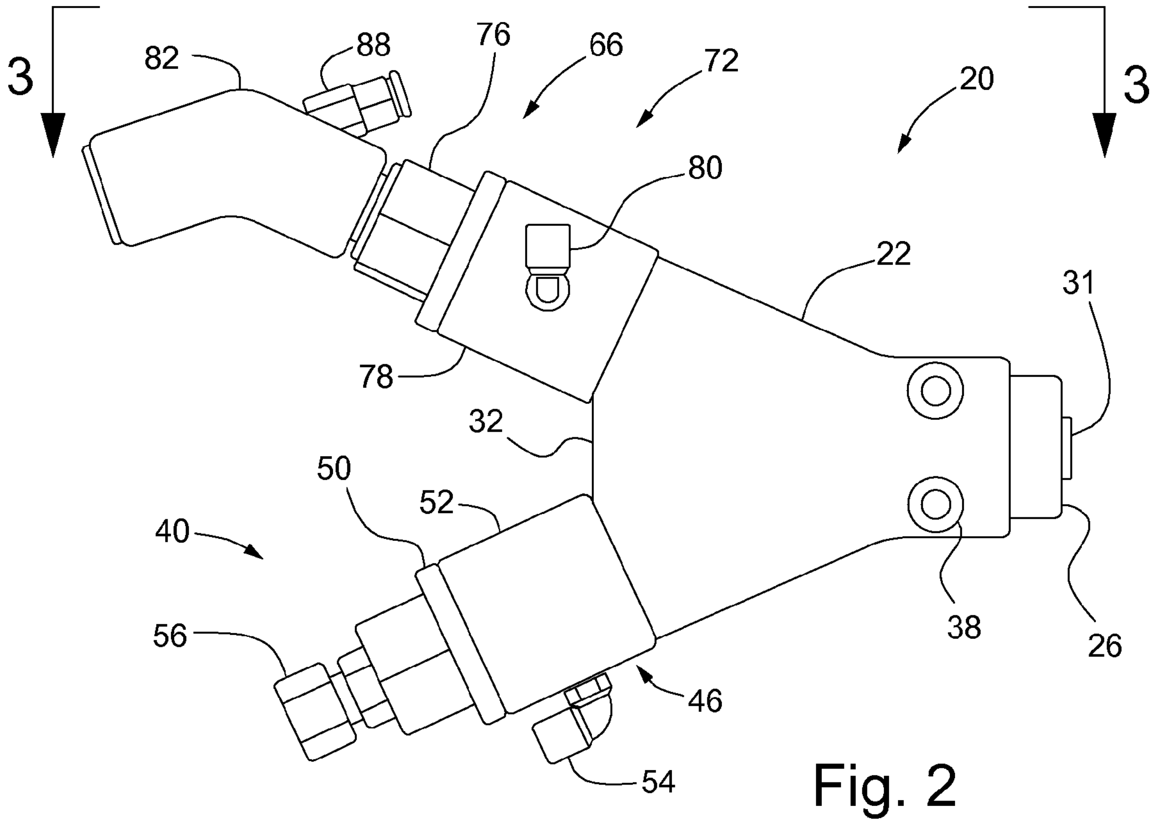
FIG. 2 is a plan view, on an enlarged scale, of the powder paint recirculation block assembly of FIG. 1.
Figure 3:
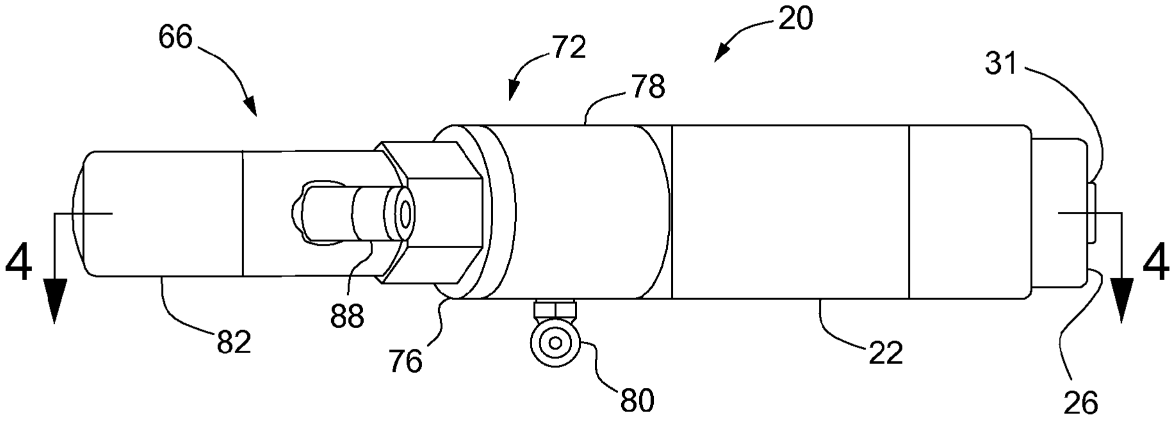
FIG. 3 is a view of the powder paint recirculation block assembly looking in the direction of arrows 3-3 in FIG. 2.
Figure 4:
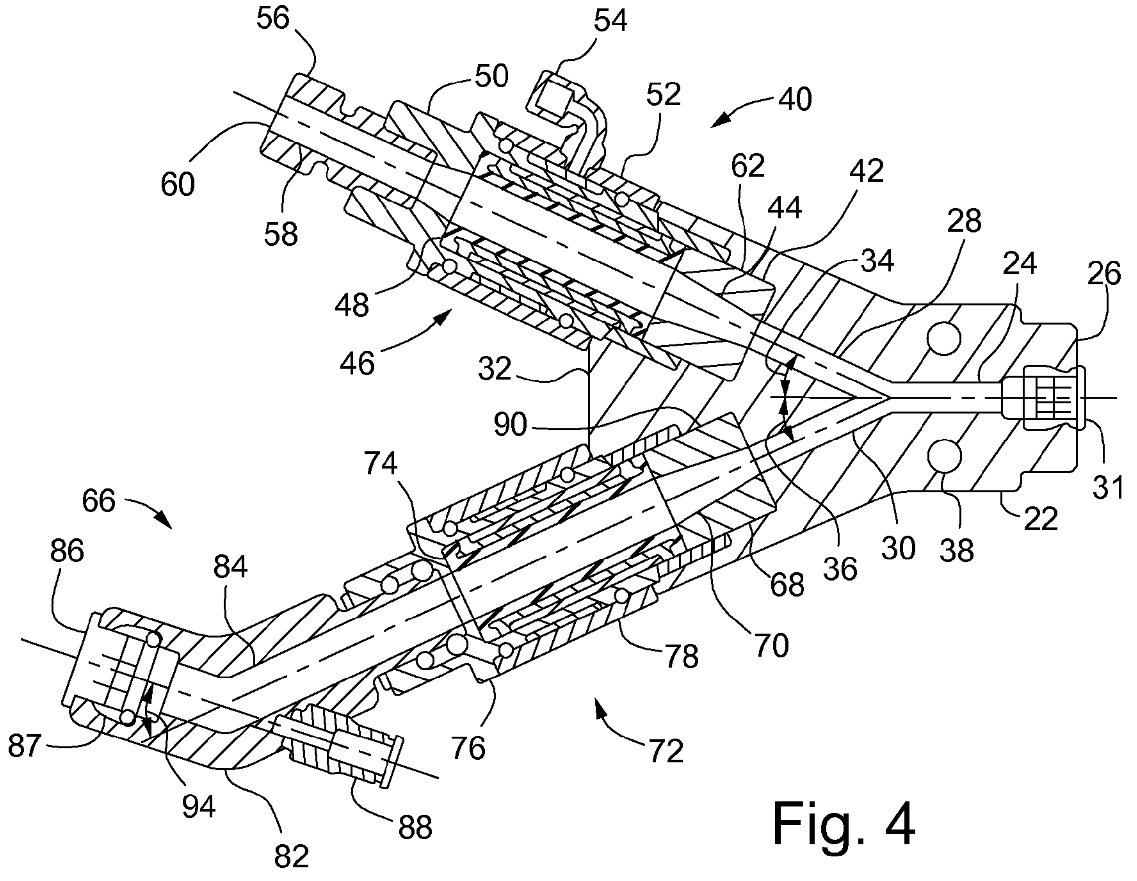
FIG. 4 is a section view, taken along lines 4-4 in FIG. 3.
Figure 5:
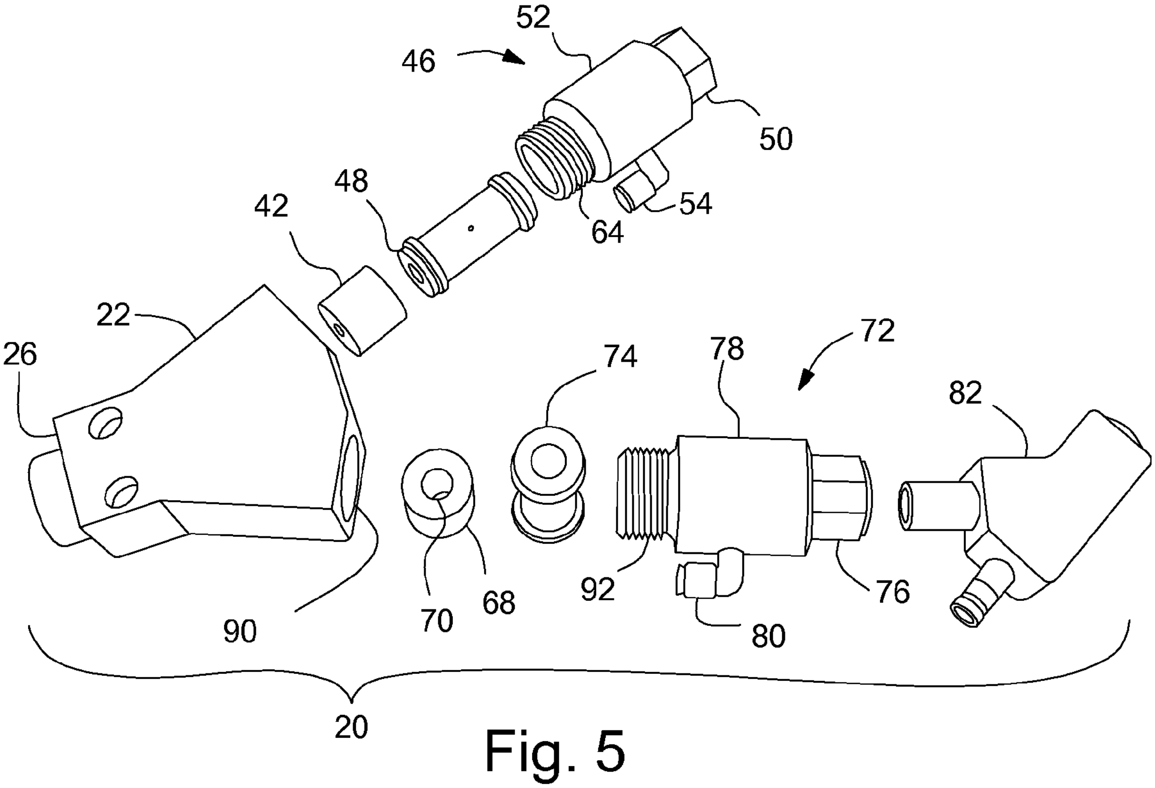
FIG. 5 is a partially exploded, perspective view, of a portion of the powder paint recirculation block assembly, with one purge air ring and one pinch rubber rotated to provide end views of those components.

Referring now to FIGS. 1-5, a powder paint recirculation block assembly, indicated generally at 20, is shown. This assembly 20 may also be referred to as a selector valve assembly since it selectively directs powdered paint through the assembly toward a paint applicator (shown in FIG. 6) or back to a source hopper (shown in FIG. 6) for the powder paint.

The block assembly 20 includes a powder paint recirculation block body 22 that is preferably made of polytetrafluoroethylene (PTFE), which has superior characteristics for powder paint flow. The block body 22 includes an intake flow passage 24 the intake flow passage 24 extends from an intake end 26 of the block body 22 to a junction connects with both an applicator flow passage 28 and a return flow passage 30. The upstream end of the intake flow passage 24 may have a push lock fitting 31 mounted therein. The passages 24, 28, 30 may be drilled from a solid PTFE block, if so desired. The applicator flow passage 28 and return flow passage 30 diverge as they extend toward an outlet end 32 of the block body 22. The angles 34, 36 (shown in FIG. 4) at which the applicator flow passage 28 and return flow passage 32, respectively, extend relative to the direction of the intake flow passage 24 are preferably less than about forty-five degrees, and more particularly less than about twenty-five degrees. These small angles 34, 36 help to assure that the change in direction of the powder paint flow will not cause impact fusion to occur, thus avoiding clogging of the flow passages. The block body 22 also includes a pair of mounting holes 38 for securing the block body 22 to a mounting surface (not shown) during paint operations.

The applicator flow passage 28 directs powder paint toward an application flow control assembly 40. The application flow control assembly 40 includes a purge air ring 42 having a conical shaped passage 44 directing powder paint into a pneumatic pinch valve assembly 46. The pinch valve assembly 46 includes a pinch rubber 48 that is removably mounted in a pinch valve body 50, a pinch valve collar 52 that mounts around the pinch valve body 50, and a pneumatic fitting 54 for connecting to a source of pressurized air. A compression fitting 56 mounts to the pinch valve body 50 and includes a passage 58 that defines an outlet 60.

The pinch valve assembly 46 may be assembled by inserting the pinch rubber 48 and purge air ring 42 into a cavity 62 in the pinch valve body 50 and sliding the pinch valve collar 52 over the outside of the pinch valve body 50. External threads 64 on an upstream end of the pinch valve body 50 may then be screwed into the block body 22, trapping and thus retaining the assembled components in proper alignment. The fitting 54 is mounted to the collar 52 and the compression fitting 56 is mounted to the pinch valve body 50. Accordingly, the pinch valve assembly 46 can be relatively easily and quickly disassembled when replacement of a worn pinch rubber 48 is needed. O-rings and seals (not numbered) may be employed as desired to seal the assembly.

The return flow passage 30 directs powder paint toward a return flow control assembly 66. The return flow control assembly 66 includes a purge air ring 68 having a conical shaped passage 70 directing powder paint into a pneumatic pinch valve assembly 72. The pinch valve assembly 72 includes a pinch rubber 74 that is removably mounted in a pinch valve body 76, a pinch valve collar 78 that mounts around the pinch valve body 76, and a pneumatic fitting 80 for connecting to a source of pressurized air. And angled connector 82 mounts to the pinch valve body 70 and includes a passage 84 that defines an outlet 86. The downstream end of the passage 84, may have a push lock fitting 87 mounted thereon. Preferably, the change in direction of the passage 84 (angle 94) is less than about forty-five degrees in order to minimize the risk that the powder paint will undergo impact fusion as it flows through the angled connector 82. The angled connector 82 also includes a check valve fitting 88 that connects to the passage 84 and can selectively direct air toward the outlet 86.

The pinch valve assembly 72 may be assembled by inserting the pinch rubber 74 and purge air ring 68 into a cavity 90 in the pinch valve body 76 and sliding the pinch valve collar 78 over the outside of the pinch valve body 76. External threads 92 on an upstream end of the pinch valve body 76 may then be screwed into the block body 22, trapping and thus retaining the assembled components in proper alignment. The fitting 80 is mounted to the collar 78 and the angled connector 82 is mounted to the pinch valve body 76. Accordingly, the pinch valve assembly 72 can be relatively easily and quickly disassembled when replacement of a worn pinch rubber 74 is needed. O-rings and seals (not numbered) may be employed as desired to seal the assembly.

Figure 6:
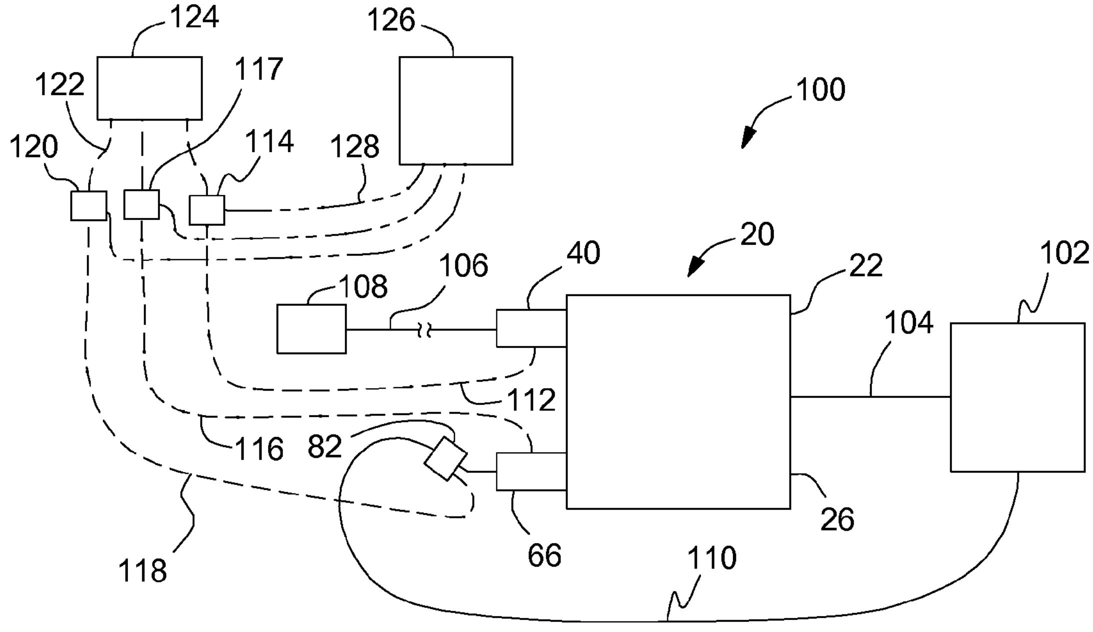
FIG. 6 is a block diagram of the powder paint recirculation block assembly of FIGS. 1-5 assembled into a portion of a powder paint transfer assembly.

FIG. 6 is a block diagram illustrating a simplified version of a powder paint transfer assembly 100 employing the powder paint recirculation block assembly 20. In FIG. 6, the solid lines leading between blocks represent lines through which powder paint flows, dashed lines between blocks represent pressurized air lines, and phantom lines between blocks represent electrical connections.

A source hopper 102 is connected to a powder paint source line 104, which connects at its downstream end to the push lock fitting 31 (shown in FIG. 4) at the intake end 26 of the block assembly 20. The downstream end of the application flow control assembly 40 leads to a powder paint line 106, which directs powder paint ultimately to an applicator 108. The downstream end of the return flow control assembly 66 leads to a powder paint return line 110, which directs powder paint back two the source hopper 102.

A first pinch valve line 112 extends between the application flow control assembly 40 and a first solenoid valve 114, a second pinch valve line 116 extends between the return flow control assembly 66 and a second solenoid valve 117, and a purge air line 118 extends between the angled connector 82 and a third solenoid valve 120. All three solenoid valves 114, 117, 120 connect to pressurized air lines 122 leading to a source of pressurized air 124. A controller 126 connects to and controls the solenoid valves 114, 117, 120, via electrical connections 128.

The operation of the powder paint recirculation block assembly 20 in the powder paint transfer assembly 100, as shown in FIGS. 1-6, will now be discussed. As powder paint is fed from the source hopper 102 through the powder paint source line 104, it enters the intake flow passage 24 of the block body 22. The controller 126 selectively controls the first solenoid valve 114 in coordination the second solenoid valve 117 to selectively apply air pressure to the pinch valve assemblies 46, 72. If the pneumatic pressure is applied to the second solenoid valve 117, but not the first solenoid valve 114, the flow of powder paint is directed into the powder paint line 106 leading to the applicator 108 and blocked from flowing into the powder paint return line 110. If the controller 126 reverses the solenoid valves 114, 117, then the flow into powder paint line 106 is blocked while flow into the return line 110 is allowed. The relatively small angles used to change the direction of flow of the powder paint through the block body 22 and the PTFE material allow for desirable powder paint flow characteristics. The potential for friction, heat and resulting impact fusion are minimized as the powder paint flows through the block assembly 20, thus reducing the risk of powder paint plugging concerns.

In addition, the powder paint return line 110 can be purged of powder paint. With the second solenoid valve 117 allowing pneumatic pressure to close the pinch valve 72 and the first solenoid valve 114 eliminating the pneumatic pressure from the pinch valve 46, the controller 126 actuates the third solenoid valve 120 to create a pneumatic pressure in the angled connector 82 via the check valve fitting 88. The compressed air entering the angled connector 82 will purge the powder paint from the powder paint return line 110, sending it back to the source hopper 102.

As periodic cleaning of the powder paint recirculation block assembly 20 occurs, the pinch rubbers 48, 74 wear, which can eventually leads to failure of the pinch rubbers 48, 74. When sufficiently worn, the pinch valve assembles 46, 72 can be disassembled from the block body 22, and the old pinch rubbers 48, 74 can be removed and replaced. The rest of the pinch valve assemblies 47, 72 and the block body 22 can be reused. Consequently, the maintenance cost for the block assembly 20 can be relatively low.

While certain embodiments of the present invention have been described in detail, those familiar with the art to which this invention relates will recognize various alternative designs and embodiments for practicing the invention as defined by the following claims.

What is claimed is:

1. A powder paint recirculation block assembly for use in a powder paint transfer assembly comprising:

a powder paint recirculation block body having an intake end and an outlet end, and including an intake flow passage, an applicator flow passage, and a return flow passage, the intake flow passage extending from the intake end to the applicator flow passage and the return flow passage, the applicator flow passage extending from the intake flow passage at a first angle that is less than forty five degrees toward the outlet end, and the return flow passage extending from the intake flow passage at a second angle that is less than forty five degrees toward the outlet end;

an application flow control assembly mounted to the recirculation block body and including a first pinch valve assembly in operative alignment with the applicator flow passage and operative to selectively prevent powder paint flow through the applicator flow passage; and a return flow control assembly mounted to the recirculation block body and including a second pinch valve assembly in operative alignment with the return flow passage and operative to selectively prevent powder paint flow through the return flow passage.

2. The powder paint recirculation block assembly of claim 1 wherein the first angle from which the applicator flow passage extends from the intake flow passage is less than twenty-five degrees and the second angle from which the return flow passage extends from the intake flow passage is less than twenty-five degrees.

3. The powder paint recirculation block assembly of claim 1 wherein the recirculation block body is made of polytetrafluoroethylene.

4. The powder paint recirculation block assembly of claim 1 wherein one of the first and second pinch valve assemblies includes a first pinch valve body that is threadably removable from the recirculation block body and a first pinch rubber that is removable from the first pinch valve body when the first pinch valve body is threadably removed from the recirculation block body.

5. The powder paint recirculation block assembly of claim 4 wherein the other of the first and second pinch valve assemblies includes a second pinch valve body that is threadably removable from the recirculation block body and a second pinch rubber that is removable from the second pinch valve body when the second pinch valve body is threadably removed from the recirculation block body.

6. The powder paint recirculation block assembly of claim 1 wherein the return flow control assembly includes an angled connector mounted on the second pinch valve assembly, the angled connector including a passage therethrough having a redirection angle of less than forty-five degrees, whereby when powder paint flows through the passage, a change in direction of flow is less than forty five degrees, the angled connector also including a purge air check valve fitting in fluid communication with the passage.

7. A powder paint recirculation block assembly for use in a powder paint transfer assembly comprising:

a powder paint recirculation block body having an intake end and an outlet end, and including an intake flow passage, an applicator flow passage, and a return flow passage, the intake flow passage extending from the intake end to the applicator flow passage and the return flow passage, the applicator flow passage extending from the intake flow passage at a first angle, and the return flow passage extending from the intake flow passage at a second angle toward the outlet end;

an application flow control assembly mounted to the recirculation block body and including a first pinch valve assembly in operative alignment with the applicator flow passage and operative to selectively prevent powder paint flow through the applicator flow passage; and a return flow control assembly mounted to the recirculation block body and including a second pinch valve assembly in operative alignment with the return flow passage and operative to selectively prevent powder paint flow through the return flow passage, and wherein one of the first and second pinch valve assemblies includes a first pinch valve body that is threadably removable from the recirculation block body and a first pinch rubber that is removable from the first pinch valve body when the first pinch valve body is threadably removed from the recirculation block body.

8. The powder paint recirculation block assembly of claim 7 wherein the other of the first and second pinch valve assemblies includes a second pinch valve body that is threadably removable from the recirculation block body and a second pinch rubber that is removable from the second pinch valve body when the second pinch valve body is threadably removed from the recirculation block body.

9. The powder paint recirculation block assembly of claim 7 wherein the first angle from which the applicator flow passage extends from the intake flow passage is less than twenty-five degrees and the second angle from which the return flow passage extends from the intake flow passage is less than twenty-five degrees.

10. The powder paint recirculation block assembly of claim 7 wherein the return flow control assembly includes an angled connector mounted on the second pinch valve assembly, the angled connector including a passage therethrough having a redirection angle of less than forty-five degrees, whereby when powder paint flows through the passage, a change in direction of flow is less than forty-five degrees, the angled connector also including a purge air check valve fitting in fluid communication with the passage.

11. The powder paint recirculation block assembly of claim 7 wherein the recirculation block body is made of polytetrafluoroethylene.

12. The powder paint recirculation block assembly of claim 7 wherein one of the application flow control and return flow control assemblies includes a first purge air ring mounted in the recirculation block body and including a first conical passage extending therethrough.

13. The powder paint recirculation block assembly of claim 12 wherein the other of the application flow control and return flow control assemblies includes a second purge air ring mounted in the recirculation block body and including second conical passage extending therethrough.

14. The powder paint recirculation block assembly of claim 7 wherein one of the first and second pinch valve assemblies includes a first pinch valve collar mounted around the first pinch valve body.

15. A method of selectively directing powder paint to a powder paint applicator and a source hopper, the method comprising the steps of:

(a) directing a flow of the powder paint into an intake flow passage extending into a powder paint recirculation block body;

(b) closing a first pinch valve assembly in a return flow control assembly while directing the flow through a second open pinch valve assembly in an application flow control assembly to thereby cause the flow of the powder paint from the intake passage through an applicator flow passage that redirects the flow of the powder paint at a first angle that is less than forty five degrees;

(c) closing the second pinch valve assembly while opening the first pinch valve assembly to thereby cause the flow of the powder paint from the intake passage through a return flow passage that redirects the flow of the powder paint at a second angle that is less than forty-five degrees;

(d) directing the powder paint from the open first pinch valve assembly into the source hopper; and (e) directing the powder paint from the open second pinch valve assembly to the powder paint applicator.

16. The method of claim 15 wherein step (b) is further defined by the first angle being less than twenty-five degrees.

17. The method of claim 15 wherein step (c) is further defined by the second angle being less than twenty-five degrees.

* * * * *